Patented May 30, 1944

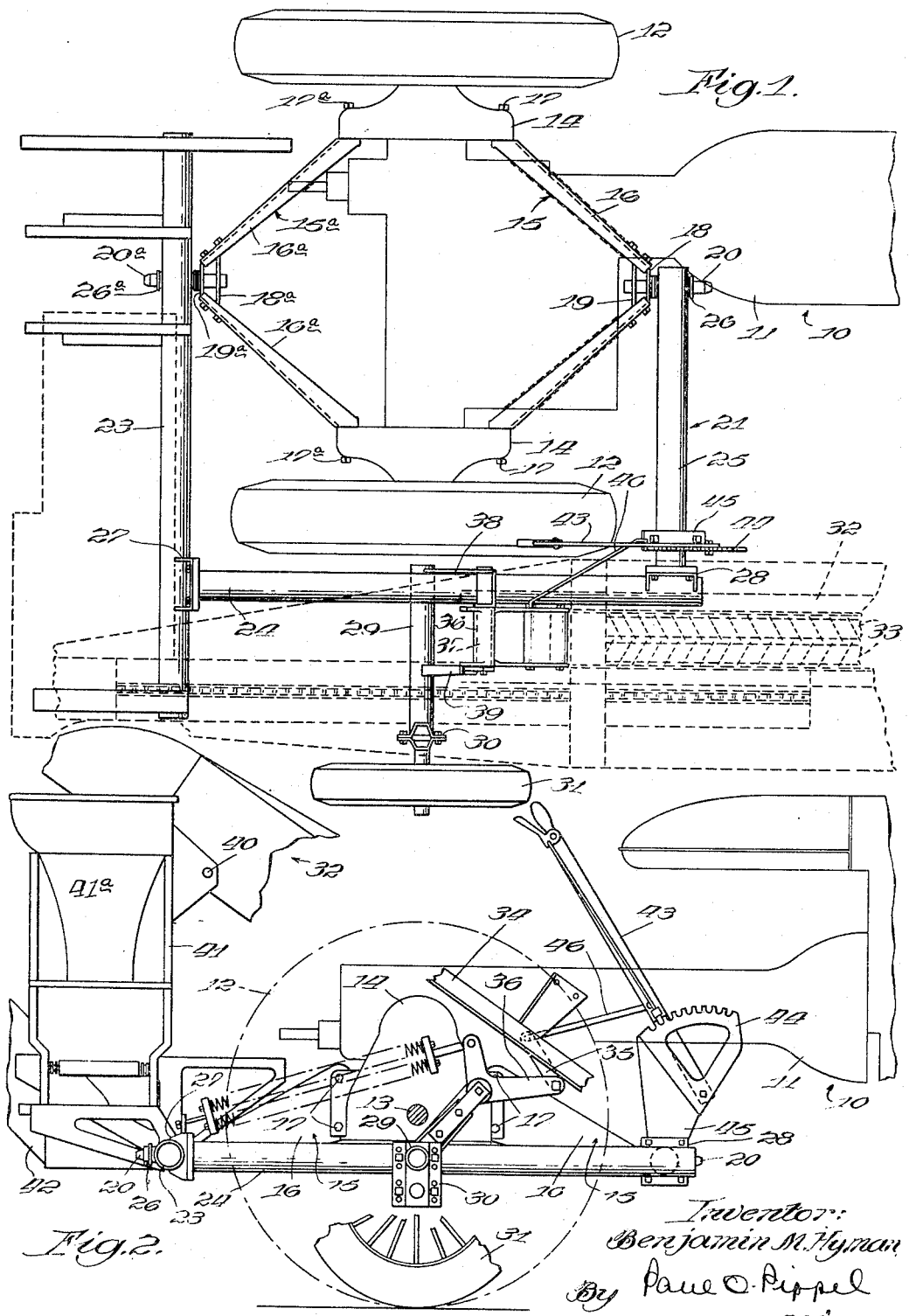

2,349,906

UNITED STATES PATENT OFFICE 2,349,906

TRACTOR-ATTACHED IMPLEMENT

Benjamin M. Hyman, Moline, Ill., assignor to International Harvester Company, a corporation of New Jersey Application August 28, 1941, Serial No. 408,645

19 Claims. (Cl. 56—15)

This invention relates to a frame for supporting an implement upon a tractor. More specifically, it relates to an implement frame which is partially supported by a tractor and partially by a separate ground wheel.

The attachment of implement frames to a tractor presents many special problems. It has been found convenient to attach a frame at the side of a tractor for supporting an implement which is moved along at the side of the tractor so that it can be closely watched and controlled by the tractor operator. The proper coupling of the implement frame to the tractor may involve a number of difficulties, since the mounting for the frame may easily become cumbersome and hard to handle, and may also take up too much space.

An object of the present invention is to provide an improved implement frame for attachment to a tractor.

Another object is an improved attachment of an implement frame to a tractor, the frame being partially supported by the tractor and partially by separate ground-engaging means.

A further object is to provide an improved mode of attachment to a tractor of a frame extending out and around one rear wheel of the tractor for support of an implement at the side of the tractor.

According to the present invention, an implement frame which extends from the rear of a tractor around one wheel and in front of the tractor axle is mounted upon the tractor at two pivot points which are longitudinally alined with respect to the tractor and are spaced from one another at opposite sides of the tractor axle. The two points of mounting are provided with supporting structures in the form of V's or U's, which are secured by the ends of the legs of the V's to depending axle housings connected with the tractor axle, the apices of the V's providing pivoting points.

In the drawing—

Figure 1 is a plan view of the rear end of a tractor, showing an implement frame attached to the tractor in the novel manner of the present invention; and Figure 2 is a side view of the structure of Figure 1, showing parts of a corn picker mounted upon the frame.

The reference character 10 designates a tractor which has a narrow, longitudinally extending body 11, which is offset from a longitudinal center line of the tractor, which is midway between rear wheels 12 connected at the end of the rear axle 13. The rear axle 13 includes depending housings 14. Secured to the housings 14 is a pair of identical V-shaped or U-shaped frame structures 15 and 15ª, which extend forwardly and rearwardly, respectively, from the axle 13. The structure 15 comprises a pair of channel frame members 16 secured to the axle housings 14 by vertically spaced sets of bolts 17. Similarly the structure 15ª comprises a pair of channel frame members 16ª secured to the axle housings 14 by vertically spaced sets of bolts 17. The frame members 16 constitute legs of the V's, and the apex of the V structure 15 is formed of parts 18 and 19 secured to the ends of the frame members 16, as by bolting. Pins 20 extend through the parts 18 and 19, being secured thereto. Similarly the apex of structure 15ª is formed of parts 18ª and 19ª, and a pin 20ª extends through these parts. Pins 20 and 20ª are in alinement with one another and provide longitudinally spaced pivots for an implement frame 21. This frame 21 is composed essentially of a member 23 extending transversely at the rear of the tractor, a member 24 extending longitudinally of the tractor and outside one rear wheel 12, and a second transverse member 25 extending transversely of the tractor and in front of the rear axle. Bushings 26 provide bearing mountings for the frame members 23 and 25 on the pins 20. The members 23 and 25 are secured to the member 24 by means indicated at 27 and 28. A member 29 extends transversely from a mid-point of the member 24 and has connected at its outer end a depending structure 30, to which is connected a supporting wheel 31. Thus, the implement frame 21 is partially supported in a pivotal manner on the tractor by means of the pins 20 secured at the apices of the forwardly and rearwardly extending V- or U-shaped structures 15, and partially on the ground wheel 31. Thus, the frame 21 may pivot with respect to the tractor about a longitudinal axis determined by the pins 20. Any desired implement may be carried on the implement frame 21, which implement is to be operated at the side of the tractor 10.

The drawing shows a corn picker 32 mounted on the frame 21. Since the corn picker itself forms no part of the present invention and is more completely shown and claimed in the copending application of Benjamin M. Hyman, Serial No. 392,924, filed May 10, 1941, it is not completely shown in the present application. However, it will be seen from Figure 1 that it includes snapping rolls 33. As indicated in Figure 2, it also includes an angle member 34 forming part of the frame of the picker. This angle member is connected by means of a link 35 to one arm of a bell-crank 36 mounted upon a pivot member 37 supported by and extending between a bracket 38 secured to the frame member 24 and a bracket 39 secured to the transversely extending member 29. The picker pivots about a point 40 upon structure 41 rigidly mounted upon the frame 21. This structure may consist simply of a chute 41ª for transferring corn laterally of the tractor to a wagon elevator 42 also mounted upon the frame 21. The picker may be adjusted with respect to the frame by means of a detent lever 43 mounted upon and engageable with an arcuate toothed member 44 secured to a bracket 45 secured in turn to the frame member 25. A link 46 connects the lever 43 with the angle member 34 of the corn picker 32. The operation of the corn picker need not be described, since it forms no part of the present invention.

It will be seen from the foregoing description that a novel mounting for an implement frame upon a tractor has been provided. The frame is mounted upon pivot points longitudinally alined with respect to the tractor and positioned forwardly and rearwardly of the axle so that the implement frame may have a vertical pivotal movement with respect to the tractor and yet is restrained from lateral movement with respect thereto. The points of pivotal mounting are provided by structures which extend forwardly and rearwardly from the rear axle of the tractor. Thus, the entire portion of the weight of the implement mounted upon the frame, which portion is carried by the tractor, is carried on the rear axle of the tractor.

The intention is to limit the invention only within the scope of the appended claims.

What is claimed is:

1. In combination, a tractor having a rear axle, an implement frame, and supporting structures in the form of V's for the implement frame connected by the ends of the legs of the V's to the tractor axle and extending forwardly and rearwardly of the axle to provide at the apices of the V's pivotal mountings for the implement frame forward and rearward of the axle.

2. In combination, a tractor having a rear axle, an implement frame, supporting structures in the form of V's for the implement frame connected by the ends of the legs of the V's to the tractor axle and extending forwardly and rearwardly of the axle to provide at the apices of the V's pivotal mountings for the implement frame forward and rearward of the axle, and ground-engaging means for supporting the implement frame.

3. In combination, a tractor having a rear axle and wheels at the ends thereof, an implement frame extending from a point to the rear of the axle and between the wheels around and outside one wheel to a point in front of the axle and between the wheels, supporting means for the implement frame connected to the rear axle and providing pivot mountings for the implement frame forward and rearward of the axle, and supporting structures in the form of V's for the implement frame connected by the ends of the legs of the V's to the tractor axle and extending forwardly and rearwardly of the axle to provide at the apices of the V's pivotal mountings for the implement frame forward and rearward of the axle.

4. In combination, a tractor having a rear axle and wheels at the ends thereof, an implement frame extending from a point to the rear of the axle and between the wheels around and outside one wheel to a point in front of the axle and between the wheels, supporting means for the implement frame connected to the rear axle and providing pivot mountings for the implement frame forward and rearward of the axle, supporting structures in the form of V's for the implement frame connected by the ends of the legs of the V's to the tractor axle and extending forwardly and rearwardly of the axle to provide at the apices of the V's pivotal mountings for the implement frame forward and rearward of the axle, and ground-engaging means for supporting the implement frame.

5. In combination, a tractor having a rear axle and wheels at the ends thereof, an implement frame extending from a point to the rear of the axle and between the wheels around and outside one wheel to a point in front of the axle and between the wheels, supporting means for the implement frame connected to the rear axle and providing pivot mountings for the implement frame forward and rearward of the axle, supporting structures in the form of V's for the implement frame connected by the ends of the legs of the V's to the tractor axle and extending forwardly and rearwardly of the axle to provide at the apices of the V's pivotal mountings for the implement frame forward and rearward of the axle, and ground-engaging means supporting the implement frame and positioned outside the wheel around which the implement frame extends.

6. In combination, a tractor having a rear axle, an implement frame, supporting structures in the form of V's for the implement frame connected by the ends of the legs of the V's to the tractor axle and extending forwardly and rearwardly of the axle to provide at the apices of the V's pivotal mountings for the implement frame forward and rearward of the axle, and ground-engaging means supporting the implement frame and positioned outside one wheel.

7. In combination, a tractor having a rear axle and wheels at the ends thereof, an implement frame extending from a point to the rear of the axle and between the wheels around and outside one wheel to a point in front of the axle and between the wheels, a supporting wheel for the frame positioned outside the said wheel, members secured to the axle adjacent the wheels and extending diagonally forwardly and rearwardly toward one another, and means connecting the ends of the members and providing for the frame two pivotal mountings alined longitudinally of the tractor.

8. In combination, a tractor having a longitudinal body structure, a transverse rear axle structure, depending housings at the ends of the axle structure, and wheels connected outside the depending housings, an implement frame extending from a point to the rear of the axle and between the wheels around and outside one wheel to a point in front of the axle and between the wheels, ground-engaging means positioned outside the said wheel for supporting the frame, and members secured to the depending housings and extending therebetween to provide a pair of spaced alined pivotal mountings for the implement frame on the tractor.

9. In the combination specified in claim 8, the alined pivotal mountings being in alinement longitudinal of the tractor.

10. In combination, a tractor having a longitudinal body structure, a transverse rear axle structure, depending housings at the ends of the axle structure, wheels connected outside the depending housings, an implement frame extending from a point between the wheels to a point outside one wheel, ground-engaging means positioned outside the said wheel for supporting the frame, and members secured to the depending housings and extending therebetween and forwardly and rearwardly of the axle structure to provide for the implement frame a pair of spaced pivotal mountings on the tractor positioned forward and rearward of the axle structure.

11. In combination, a tractor having a rear axle, an implement frame, and supporting means for the implement frame connected to the rear axle to provide pivot mountings of the implement frame forward and rearward of the axle and to transmit to the rear axle the entire portion of the weight of the frame carried by the tractor.

12. In combination, a tractor having a rear axle and rear traction wheels, an implement frame, ground-engaging means for carrying a portion of the weight of the implement frame, and supporting means for the implement frame connected to the rear axle to provide pivot mountings for the implement frame forward and rearward of the axle and to transmit to the rear axle the entire weight of the implement frame not carried by the ground-engaging means.

13. In the combination specified in claim 12, the ground-engaging means being positioned outside one traction wheel.

14. In combination, a tractor having a rear axle and rear traction wheels at the ends thereof, an implement frame extending from a point to the rear of the axle and between the wheels around and outside one wheel to a point in front of the axle and between the wheels, and supporting means for the implement frame connected to the rear axle to provide two spaced pivotal mountings generally alined longitudinally of the tractor and to transmit to the rear axle the entire portion of the weight of the implement carried by the tractor.

15. In combination, a tractor having a rear axle and rear traction wheels at the ends thereof, an implement frame extending from a point to the rear of the axle and between the traction wheels outside and around one traction wheel to a point to the front of the rear axle and between the wheels, ground-engaging means for supporting a portion of the weight of the implement frame, and supporting means for the implement frame connected to the rear axle to provide two spaced pivotal mountings and to transmit to the rear axle the entire portion of the weight of the frame not carried by the ground-engaging means.

16. In the combination specified in claim 15, the ground-engaging means being outside of the traction wheel around which the frame extends.

17. In combination, a tractor having a rear axle and rear traction wheels, an implement frame extending from a point to the rear of the rear axle and between the wheels around and outside one traction wheel to a point in front of the axle and between the wheels, and supporting means for the implement frame connected to the rear axle to provide for the implement frame pivot mountings between the wheels and forward and rearward of the axle and to transmit to the rear axle the entire portion of the weight of the frame carried by the tractor.

18. In combination, a tractor having a rear axle and rear traction wheels, an implement frame extending from a point to the rear of the rear axle and between the wheels around and outside one wheel to a point in front of the axle and between the wheels, ground-engaging means for carrying a portion of the weight of the implement frame, and supporting means for the implement frame connected to the rear axle to provide for the implement frame pivot mountings between the wheels and forward and rearward of the axle and to transmit to the rear axle the entire weight of the implement frame not carried by the ground-engaging means.

19. In the combination specified in claim 18, the ground-engaging means supporting the implement frame being outside the said one traction wheel around which the frame extends.

BENJAMIN M. HYMAN.